United States Patent
Dyballa

[19]

[11] Patent Number: 6,133,966
[45] Date of Patent: Oct. 17, 2000

[54] MONITOR COVER

[76] Inventor: Beate Dyballa, Nehringstrasse 4a, 14059 Berlin, Germany

[21] Appl. No.: 09/441,165

[22] Filed: Nov. 15, 1999

[30] Foreign Application Priority Data

Nov. 20, 1998 [DE] Germany ............... 298 21 293 U

[51] Int. Cl.⁷ .................................................. H04N 5/64
[52] U.S. Cl. ............................................ 348/842; 248/918
[58] Field of Search ..................... 312/7.2; 40/492, 40/594, 725, 486; D14/114; 248/442.2, 918, 205.2; 348/841, 842

[56] References Cited

U.S. PATENT DOCUMENTS

| | | | |
|---|---|---|---|
| 3,329,770 | 7/1967 | Rose | 348/842 X |
| 4,314,280 | 2/1982 | Rose | 348/842 |
| 5,035,392 | 7/1991 | Gross et al. | 248/918 X |
| 5,292,099 | 3/1994 | Isham et al. | 248/442.2 |
| 5,398,905 | 3/1995 | Hinson | 248/442.2 |
| 5,464,214 | 11/1995 | Griffin | 312/7.2 X |
| 5,499,793 | 3/1996 | Salansky | 248/918 X |
| 5,549,267 | 8/1996 | Armbruster et al. | 248/442.2 |
| 5,564,209 | 10/1996 | Zagnoli | 40/594 |
| 5,683,070 | 11/1997 | Seed | 248/918 X |

FOREIGN PATENT DOCUMENTS

| | | |
|---|---|---|
| 2035990 | 1/1972 | Germany . |
| 2548121 | 5/1977 | Germany . |
| 3343339 | 6/1985 | Germany . |
| 4427643 | 2/1996 | Germany . |
| 19707574 | 6/1998 | Germany . |

OTHER PUBLICATIONS

German design registration M9710573, Figure 1, Apr. 1998.
German design registration M9307942, Figures 1–4, Feb. 1994.

*Primary Examiner*—Peter M. Cuomo
*Assistant Examiner*—James O. Hansen
*Attorney, Agent, or Firm*—Gabriel P. Katona L.L.P.

[57] ABSTRACT

A monitor cover having a frame securable against the front shape of a monitor, and a covering on the frame and attached from the frame, the covering being movable toward and away from the front of a monitor, the covering being optionally formed from a plurality of covering elements vertically disposed respectively above and under one another and separated from each other whereby each element is movable toward and away from the front of a monitor independently of each other for partially or entirely covering the front of the monitor.

9 Claims, 6 Drawing Sheets

MONITOR COVER

FIELD OF INVENTION

The present invention relates to a monitor cover, such as for computer monitors, within a frame applicable to the front display surface of a monitor.

BACKGROUND

It is known to cover monitors. For example, German published patent application 2,035,990 describes a hinged front cover for television picture tubes, with covering flaps that can be stepwise swung away from in front of the tube. Movement of the flaps is accomplished by swinging them away from the plane of the display area by movement toward a side flap that can also be swung outward. One embodiment is like a rolltop cover conducted within rails. This presents a cost and labor intensive structure which requires several separate activating movement mechanisms.

German published application No. 2,548,121 discloses mainly a cover for a television set which also serves as a stand therefor. This enables locating the television set in an inconspicuous place in the center of a room. The body of the device is a sphere with an opening for the monitor into which the TV set can be inserted. The opening cannot be closed, and the cover entirely envelops the TV set.

German published application No. 3,343,339 shows a front cover for a television set, with a decorative embodiment for hiding the unattractive features of the set with some swingable elements.

The state of the art in general provides solutions which contain similar functional elements, but conceptionally follow entirely different solutions than the present invention.

SUMMARY DESCRIPTION OF THE INVENTION

The object of the present invention is to provide a monitor cover for the front of a monitor, the cover being mounted from a frame applied over the contours of the front of the monitor, and movably mounted from the frame providing a covering for the monitor.

According to the present invention there is provided a monitor cover having a frame applicable against the front shape of a monitor, and a covering on the frame and attached from the frame, the covering being movable toward and away from the front of a monitor, the covering being optionally formed from a plurality of covering elements vertically disposed respectively above and under one another and separated from each other whereby each element is movable toward and away from the front of a monitor independently of each other for partially or entirely covering the front of the monitor.

Various decorative forms and contours can be suitably provided for the one or the optionally more of the covering elements. Thus a decorative cover can be applied to and held fast on a monitor without the need for any special tools or instrumentalities, for covering the display surface of the monitor. The plurality of the vertically arranged covering element that are individually movable away from and toward the monitor surface, permit partial or complete coverage of the display surface. Therefore, displayed indicia on a part of a monitor display can appear together with any decorative overlay over other parts of the monitor display. This also enables the display of different messages intended for different addressees of those messages, either displayed directly or from a storage device. This can be conveniently accomplished, for example, by different persons moving different elements of said covering away from the monitor surface to display indicia addressed for such different persons. This technically simple messaging system also permits the application of various decorative elements as a part of the covering, along with any messaging indicia displayed under other elements thereof. According to one suitable embodiment of the present invention, one decoratively contoured covering pat can range into the area of a complimentarily shaped adjacent covering element.

With the monitor cover of the present invention either selected covering elements can be removed from in front of parts of the display surface of the monitor, or all elements can be removed from covering the monitor, and thus the entire display surface of the monitor can be made viewable without it being covered at all.

BRIEF DESCRIPTION OF THE DRAWING

The invention is disclosed in greater detail hereinbelow, with reference being had to the drawing, wherein.

DETAILED DISCLOSURE

Figure 1:
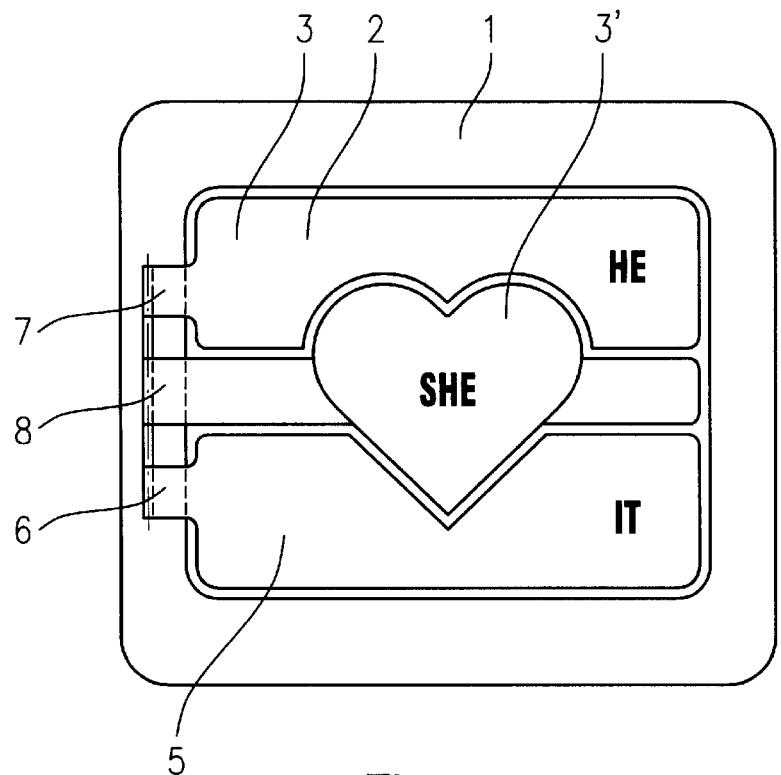
FIG. 1 is a front view of a monitor with its entire display area being covered.
Figure 2:
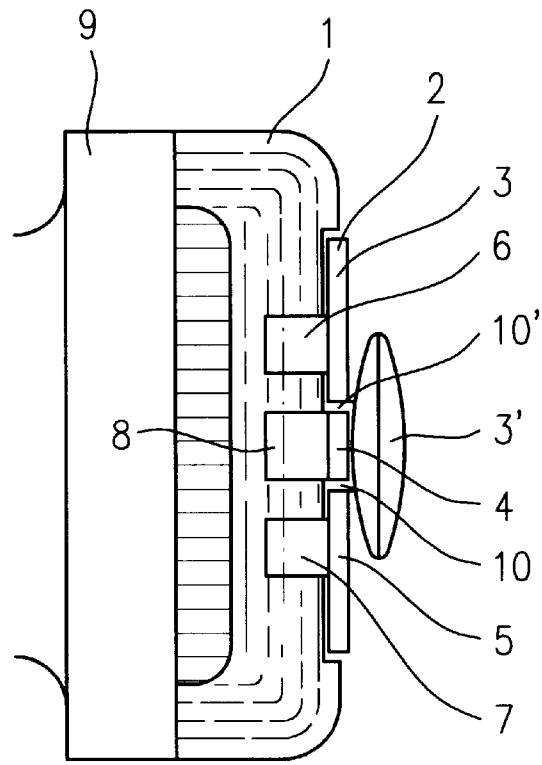
FIG. 2 is a side view of the monitor cover.

FIG. 1 shows the front view of a monitor cover. A cover 2 is arranged over a frame 1. The cover 2 has horizontally arranged covering elements 3, 4, 5. each of the covering elements is individually swingably attached from the frame 1, such as by Velcro fasteners, so that each by being swung away from in front of the display area of the monitor will permit visibility of the particular portion of the display area that can be covered by each element. The individual elements can also be suitably locked at their other ends in place, when covering the display area, suitably also by Velcro closures. The outer elements 3, 5 are complementarily contoured along the periphery of the central element 4 which, as shown in FIG. 2, can be provided with an overlayer 3' for a 3-dimensional effect. Optionally this overlayer 3' can be separately swung away from the part of the element 4 that is under it. The element 3 is labeled in the illustrated embodiment with the initials ER, for serving as a message display window for someone having these initials. In a like manner, other elements are shown to have the initials SIE and ES thereon.

In the side view of FIG. 2 the cover of the present invention is shown applied to a monitor 9. The overlayer 3' is part of the heart-shaped contour of the central element shown in FIG. 1. Hinges 6, 7, 8 are shown for the various covering elements, which permit their swingable mounting with respect to the frame 1.

Figure 3:
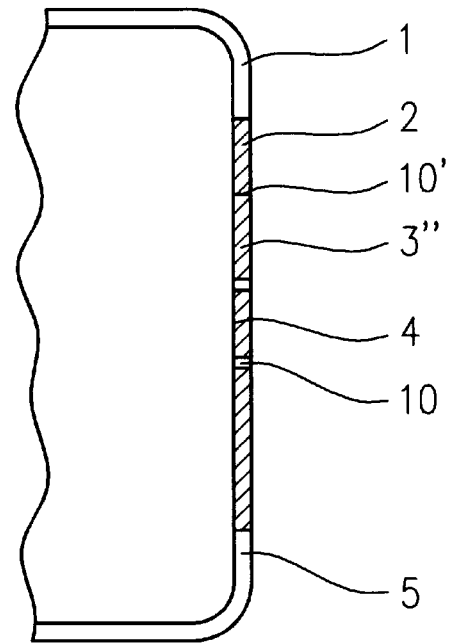
FIG. 3 is a schematic cross-sectional side view of the monitor cover.

In the side view of FIG. 3 the monitor cover of the present invention is shown without an attached monitor. The covering elements are swung inwardly in a position in which they cover all parts of the display area of a monitor. In the embodiment of the present invention shown in FIG. 3, an overlayer 3" is shown instead of, but having the same contours as, the overlayer 3' of the embodiment of FIG. 2, but here contoured only as a flat element with respect to its underlaying element 4, and flush with the elements 4, 5 arranged vertically above and below.

Figure 4:
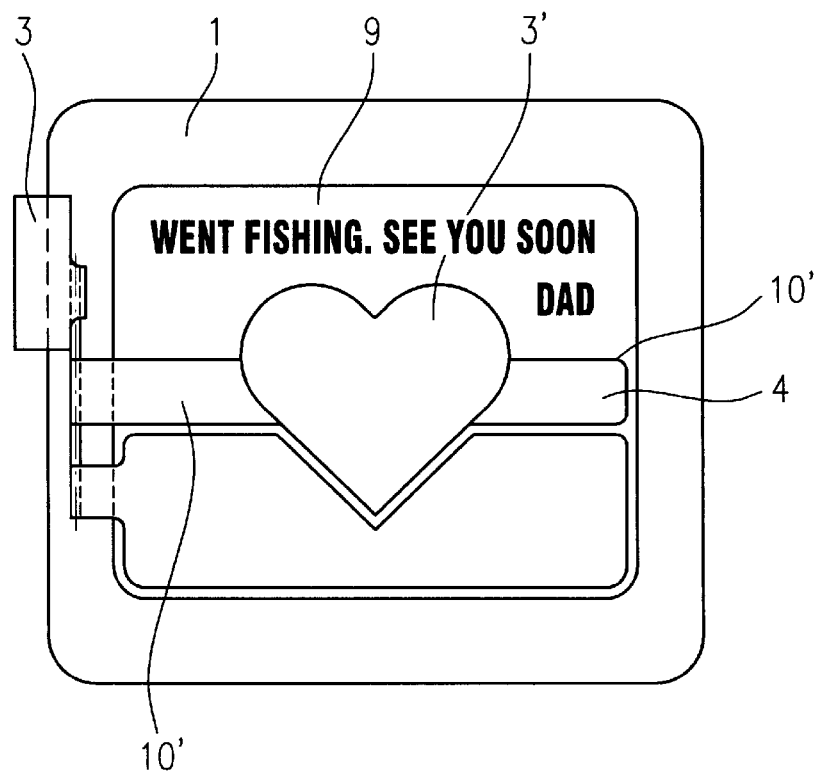
FIG. 4 is a front view of a monitor, with the upper covering element removed from in front of the display surface.
Figure 5:
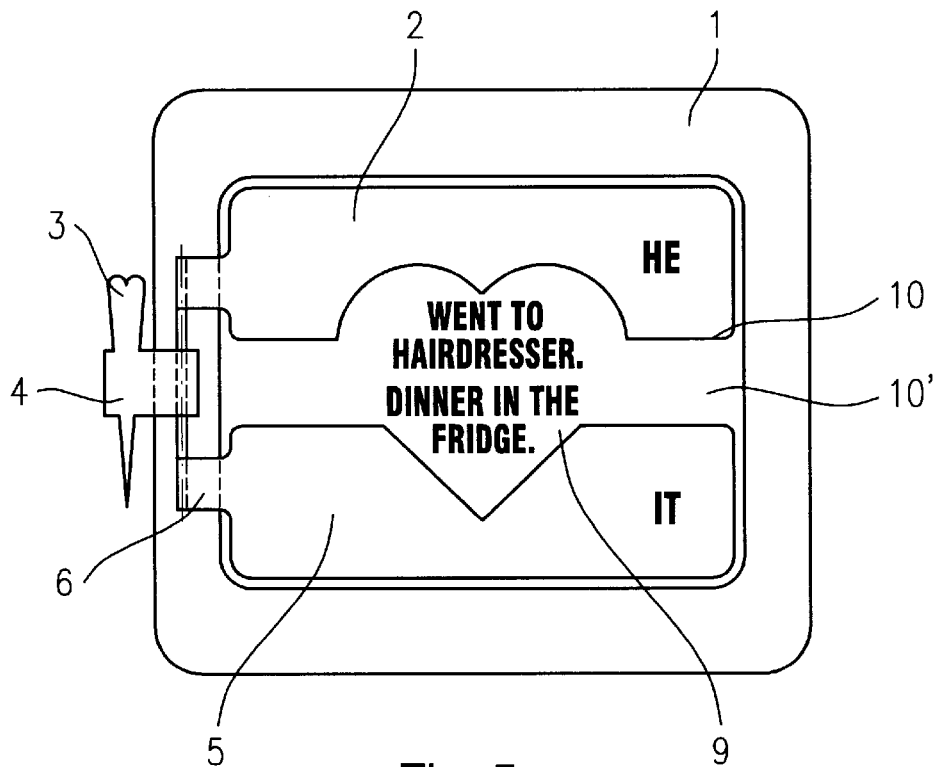
FIG. 5 is a front view of a monitor, with a central covering element removed from in front of the display surface.
Figure 6:
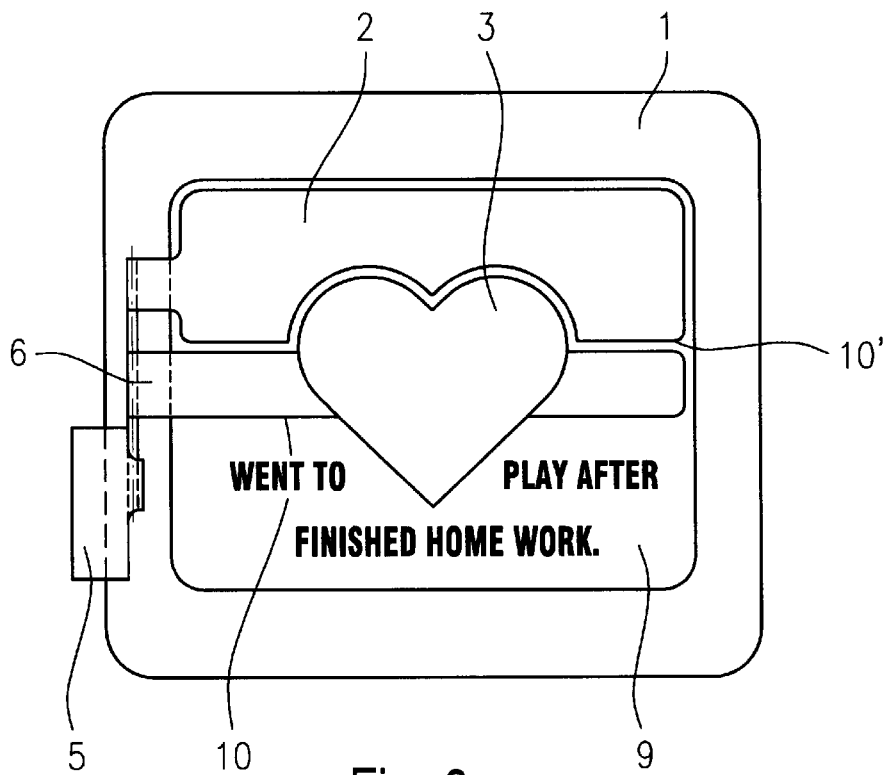
FIG. 6 is a front view of a monitor, with the lower covering element removed from in front of the display surface.
Figure 7:
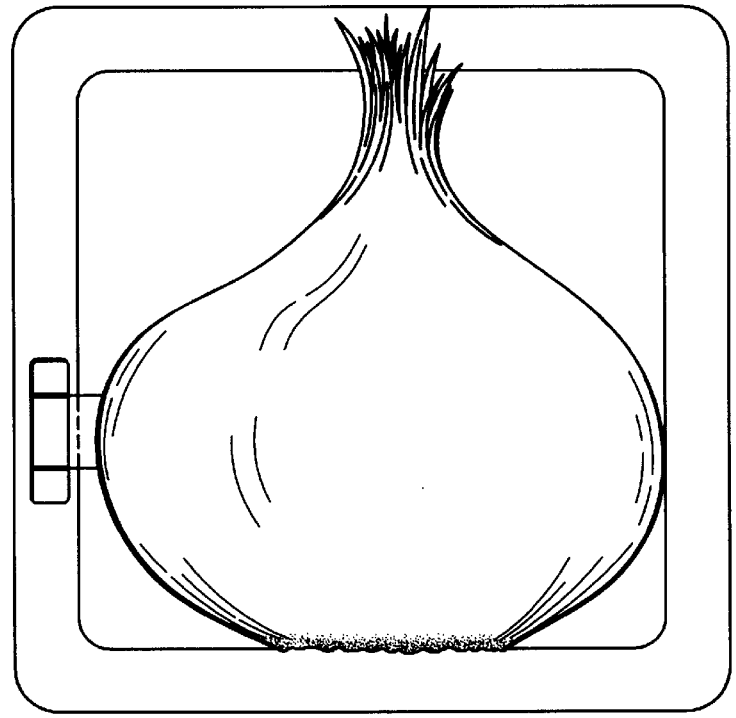
FIGS. 7–11 show various decorative contours for one of optionally more (not shown) of said covering elements.
Figure 8:
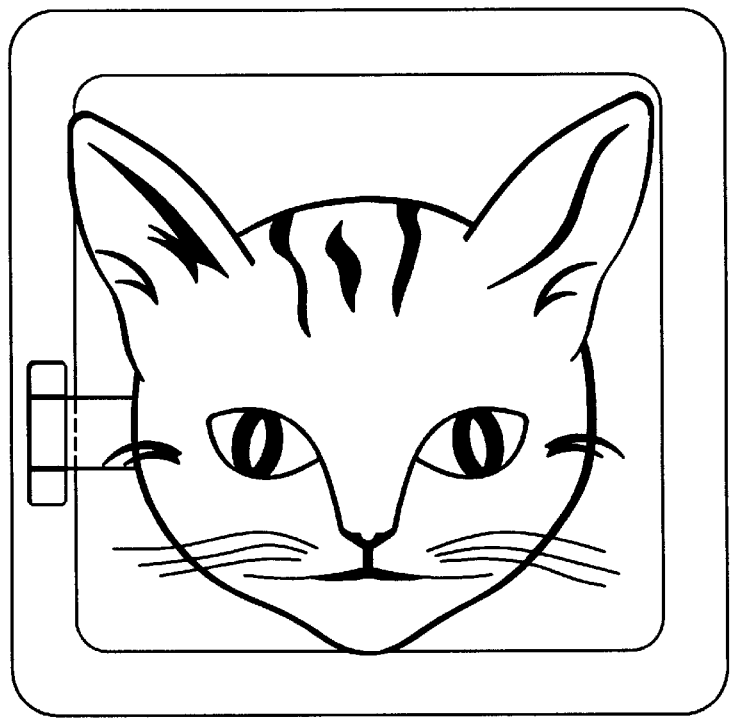
Figure 9:
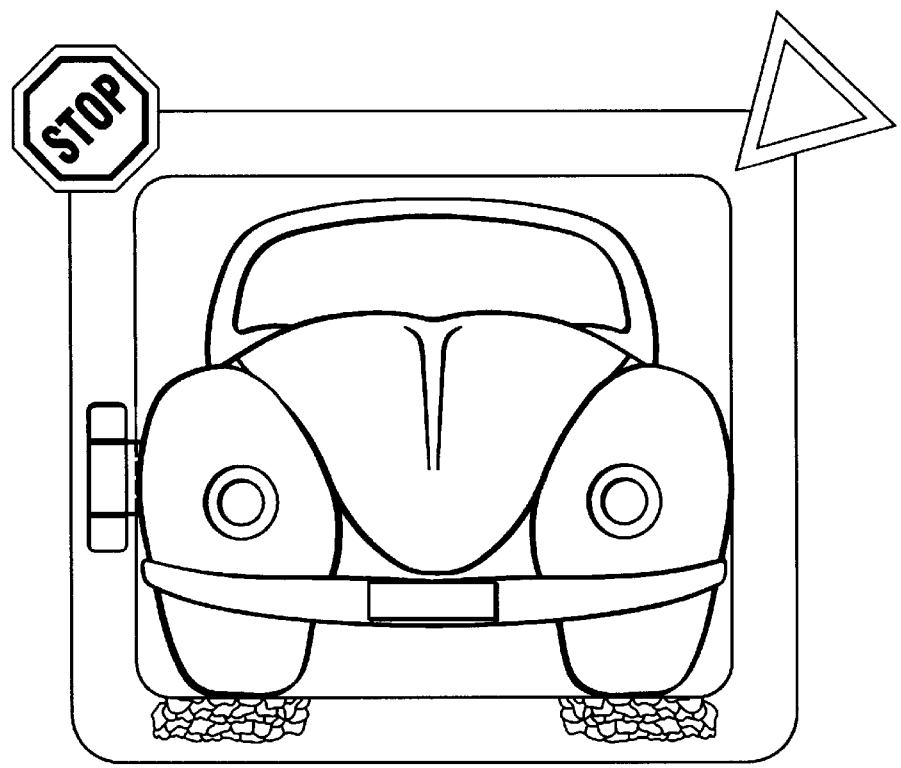
Figure 10:
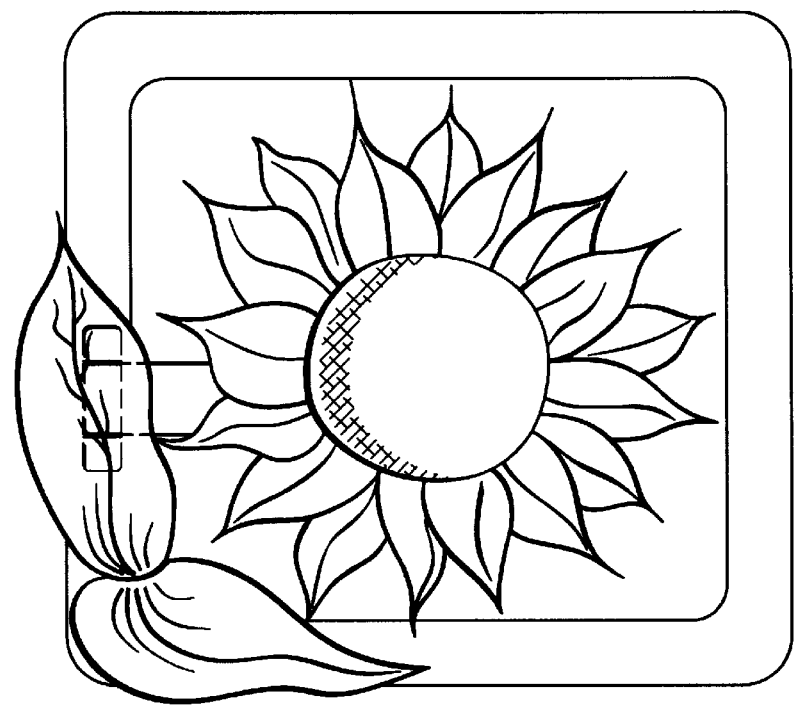
Figure 11:
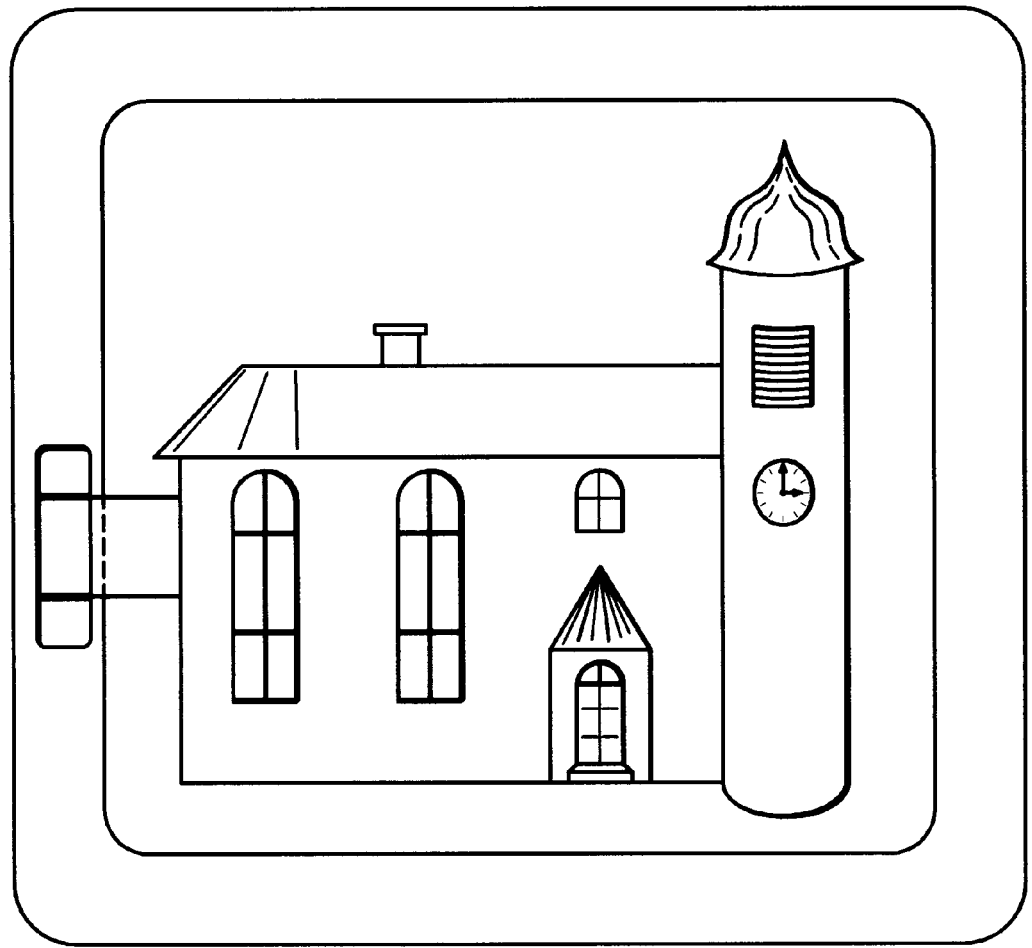

FIG. 4 shows an embodiment of the present invention that is comparable to that of FIG. 1, but here with the top covering element 3 swung free on its hinge 6 from the display surface below that covering element. The message on the exposed upper part of the monitor display area is in German for an intended German speaking recipient of the message, namely the person with the initials ER in FIG. 1. FIGS. 5 and 6 show other respective covering elements swung away to expose respective German messages for the persons with the respective initials SIE and ES as shown in FIG. 1. These messages can be easily applied, such as by keyboarding or from a buffer, onto various parts of the display area of a PC monitor. An addressee of a message can also leave an acknowledgement of having read the message, or an answer in any corresponding location.

In FIGS. 7–11 various embodiments of the elements 3 or 3' are shown in a variety of contours and representations. In these embodiments of the present invention the elements 3, 4, 5 are not shown, or are not even present. These additional contours illustrate the variety of decorative elements that can be employed in accordance with the present invention, including objects of nature, animals, plants and constructs.

I claim:

1. A monitor cover for a monitor having a front shape, the monitor cover having a frame securable against the front shape of said monitor, and a plurality of covering elements attached to said frame, said covering elements being movable toward and away from the front of said monitor, said covering elements being disposed vertically above one another and being separated and spaced vertically from each other whereby each element is movable toward and away from the front of said monitor independently of each other for partially and entirely covering vertical front portions of said monitor.

2. The monitor cover of claim 1, wherein said frame has three of said covering elements including a center covering element, said center covering element having a three-dimensional contour.

3. The monitor cover of claim 1, wherein said frame has at least three of said covering elements, at least one of said covering elements being formed with two dimensional contours.

4. The monitor cover of claim 3, wherein at least one of the said covering elements is adapted to swing away from in front of the monitor.

5. The monitor cover of claim 1, wherein the contours of at least one of said covering elements is formed in the shape of an object from nature.

6. The monitor cover of claim 1, wherein the contours of at least one of said covering elements is formed in the shape of an animal.

7. The monitor cover of claim 1, wherein the contours of at least one of said covering elements is formed in the shape of a plant.

8. The monitor cover of claim 1, wherein the contours of at least one of said covering elements is formed in the shape of a construct.

9. The monitor cover of claim 1, wherein said frame comprises three covering elements including a center covering element with two-dimensional decorative contours, said center covering element being disposed with its decorative contours between complementarily contoured outer elements.

* * * * *